(12) United States Patent
Akagawa et al.

(10) Patent No.: US 7,744,045 B2
(45) Date of Patent: Jun. 29, 2010

(54) DISPLAY DEVICE

(75) Inventors: Kouji Akagawa, Takefu (JP); Kenji Shimoshita, Takefu (JP)

(73) Assignee: Orion Electric Co., Ltd., Takefu (JP)

( * ) Notice: Subject to any disclaimer, the term of this patent is extended or adjusted under 35 U.S.C. 154(b) by 208 days.

(21) Appl. No.: 11/181,919

(22) Filed: Jul. 15, 2005

(65) Prior Publication Data

US 2006/0011797 A1 Jan. 19, 2006

(30) Foreign Application Priority Data

Jul. 16, 2004 (JP) ............................. 2004-210436

(51) Int. Cl.
*F16L 3/00* (2006.01)
(52) U.S. Cl. .................. 248/121; 248/146; 248/371; 248/398; 312/7.2
(58) Field of Classification Search ............... 248/121, 248/127, 128, 158, 157, 161, 176.1, 917, 248/919, 921, 922, 923, 371, 398, 220.21, 248/220.22, 346.03, 146; 361/681, 679.23; 312/7.2, 351.1, 351.3, 237
See application file for complete search history.

(56) References Cited

U.S. PATENT DOCUMENTS

| 6,094,340 | A  | * | 7/2000  | Min ....................... 361/679.22 |
| 6,189,849 | B1 | * | 2/2001  | Sweere et al. ............. 248/286.1 |
| 6,712,321 | B1 | * | 3/2004  | Su et al. ................. 248/123.11 |
| 6,905,103 | B2 | * | 6/2005  | Kim ........................... 248/398 |
| 7,036,787 | B1 | * | 5/2006  | Lin ............................. 248/676 |
| 7,150,440 | B2 | * | 12/2006 | Yuan ....................... 248/372.1 |
| 7,159,828 | B1 | * | 1/2007  | Yau et al. .................. 248/125.8 |
| 7,236,215 | B2 | * | 6/2007  | Okamoto et al. ............... 349/58 |
| 7,303,174 | B2 | * | 12/2007 | Li ........................... 248/346.06 |
| 7,651,062 | B2 | * | 1/2010  | Matsutani et al. ......... 248/176.3 |
| 7,667,955 | B2 | * | 2/2010  | Takeda ................... 361/679.21 |
| 2002/0149906 | A1 |   | 10/2002 | Ichimura |
| 2003/0103092 | A1 | * | 6/2003  | Byoun et al. ................. 345/866 |

(Continued)

FOREIGN PATENT DOCUMENTS

EP    1 318 445 A2    6/2003

(Continued)

OTHER PUBLICATIONS

European Search Report issued in EPO Appln. No. 05 254 388.1, dated Oct. 1, 2008.

*Primary Examiner*—A. Joseph Wujciak, III
*Assistant Examiner*—Todd M. Epps
(74) *Attorney, Agent, or Firm*—Westerman, Hattori, Daniels & Adrian, LLP

(57) ABSTRACT

The invention provides a display device having an improved exterior appearance by covering a bracket including a display unit with a back cabinet, capable of having a stand attached thereto and removed therefrom without taking off the back cabinet. A display unit 1 is fixed inside a cabinet 5 composed of a front cabinet 5A and a back cabinet 5B. An opening 28 is formed to the back cabinet 5B having an inner diameter D1 greater than an outer diameter D of a head portion 25A of a fixing screw 25. Thus, the stand 15 can be disassembled from the display unit 1 without taking off the back cabinet 5B, by removing a disengaged fixing screw 25 through the opening 28 to the exterior.

9 Claims, 6 Drawing Sheets

U.S. PATENT DOCUMENTS

2004/0155166 A1    8/2004    Kim

FOREIGN PATENT DOCUMENTS

| | | |
|---|---|---|
| EP | 1 318 445 A3 | 6/2003 |
| JP | 09-127882 A | 5/1997 |
| JP | 11-282366 A | 10/1999 |
| JP | 2001-332074 | 11/2001 |
| JP | 2002-350814 * | 4/2002 |
| JP | 2002-350814 A | 12/2002 |
| JP | 2003-8252 | 1/2003 |
| JP | 2003-66863 | 3/2003 |
| JP | 3097842 U | 9/2003 |
| JP | 2004-118191 | 4/2004 |
| JP | 2004-126456 | 4/2004 |
| KR | 2004-0024260 A | 3/2004 |

* cited by examiner

DISPLAY DEVICE

The present application is based on and claims priority of Japanese patent application No. 2004-210436 filed on Jul. 16, 2004, the entire contents of which are hereby incorporated by reference.

BACKGROUND OF THE INVENTION

1. Field of the Invention

The present invention relates to a display device, and more specifically, to a display device having a display unit with a liquid crystal panel and a detachable stand for supporting the display unit.

2. Description of the Related Art

In recent years, thin flat panel display devices such as PDP and liquid crystal panels are widely used as display devices for personal computers and television receivers. Such display devices utilizing liquid crystal panels have a stand that supports the display portion when placed on the floor or the like. Various arrangements of the display device with a stand have been proposed. For example, Japanese Patent Application Laid-Open Publications No. 2001-332074, No. 2003-8252, No. 2003-66863 and No. 2004-126456 (patent documents 1 through 4) disclose an arrangement in which a display portion is formed by covering a display unit including a liquid crystal panel with a front cabinet and a back cabinet, and having a bracket for fixing the display portion to a stand for supporting the display portion, wherein the bracket is butted against the rear face of the back cabinet and directly screw-engaged via the back cabinet to a metallic mounting cover or the like to fix the stand. Further, Japanese Patent Application Laid-Open Publication No. 2004-118191 (patent document 5) discloses a flat display with a removable stand, having a simplified stand provided to the display portion that can be inserted to a hollow portion formed to a base stand to allow the display portion to be attached to the base stand.

The arrangement disclosed in patent documents 1 through 4 having the bracket of the stand fixed either directly to the back cabinet or to the mounting cover of the liquid crystal panel disposed in the cabinet is not attractive from the view point of exterior design, since the bracket and the multiple fixing screws for fixing the bracket are directly visible to the exterior. According to the arrangement disclosed in patent document 5 in which the simplified stand formed on the display portion is inserted to the hollow portion of the base stand to allow the base stand to support the display portion, the appearance of the device is good since the bracket and the fixing screws are not exposed, but the simple insertion of the simplified stand to the hollow portion of the base stand causes the display unit to be detached easily from the base stand. Therefore, according to patent document 5, an engagement unit with a spring-like structure is fixed inside the hollow portion to be engaged to a hole formed to the simplified stand to prevent the display portion from being easily detached from the base stand, which causes the arrangement to be complex with respect to the arrangements of patent documents 1 through 4 where the stand is fixed simply via fixing screws. Therefore, in order to provide an arrangement capable of fixing the display portion easily via a simple structure by using fixing screws and the like and also capable of preventing the fixing screws from being directly exposed to the exterior, it may be effective to cover the bracket and the fixing screws with the back cabinet. However, if the bracket or the fixing screws are covered by the back cabinet, when it is necessary to detach the display portion from the stand for example to hang the display on the wall, the back cabinet must first be removed before disengaging the fixing screws fixing the display portion to the stand, deteriorating work efficiency. Moreover, various adjustment works such as color adjustment, color correction and image position adjustment of the liquid crystal panel are required in these types of display devices, but since the display portion cannot be supported without the stand, the adjustment work cannot be carried out stably without the stand.

SUMMARY OF THE INVENTION

The present invention aims at solving the problems of the prior art mentioned above, by providing a display device having the bracket to which the display unit is fixed covered by the back cabinet to improve the exterior design, capable of detaching the stand without removing the back cabinet, and capable of having the display portion stand alone stably when adjusting the liquid crystal panel.

A first aspect of the present invention relates to a display device comprising: a display unit having a liquid crystal panel on a front face thereof; a display portion having a front cabinet with a display window for the liquid crystal panel and a back cabinet, and having the display unit built therein; and a stand for supporting the display portion; wherein the display device further comprises a mounting bracket extending downward from the display unit; a supporting bracket provided on the stand and fixed to the mounting bracket; and a fixing member for fixing the supporting bracket to the mounting bracket; wherein the back cabinet covers at least the mounting bracket, and is provided with an opening for the fixing member to pass through.

According to the arrangement of the first aspect of the invention, the mounting bracket is covered by the back cabinet and thus is not exposed directly to the exterior. Further, upon fixing the display portion including the liquid crystal panel and the stand for supporting the display, the fixing member can be inserted through the opening formed to the back cabinet into the display portion to tighten the fixing member from outside the back cabinet so as to fix the stand to the display portion including the display unit. On the other hand, when the display portion is to be hung on a wall, the fixing member is disengaged through the opening on the back cabinet and removed through the opening. Thus, the display portion including the display unit can be separated from the stand without taking off the back cabinet.

A second aspect of the present invention relates to the display device according to the first aspect, wherein the mounting bracket is fixed to the front cabinet side.

According to the arrangement of the second aspect, the display portion including the display unit can be fixed to the stand by fixing the mounting bracket fixed to the front cabinet and the supporting bracket provided on the stand.

A third aspect of the present invention relates to the display device according to the first aspect, wherein the fixing member is composed of a fixing screw, and an inner diameter of the opening is formed greater than a diameter of the fixing screw.

According to the arrangement of the third aspect, the fixing screw for fixing together the supporting bracket of the stand and the mounting bracket of the display unit can be tightened from outside the back cabinet without taking off the back cabinet, and when it is necessary to detach the display portion from the stand, the disengaged fixing screw can be removed through the opening.

The fourth aspect of the present invention relates to the display device according to any one of the above aspects, further comprising a positioning means for positioning the supporting bracket in a height direction and a width direction with respect to the mounting bracket.

According to this arrangement, upon fixing the supporting bracket to the mounting bracket, the supporting bracket can be positioned on the mounting bracket using the positioning means.

The fifth aspect of the present invention relates to the display device according to the fourth aspect, wherein a pair of guide rails is formed to at least one of the mounting bracket or the supporting bracket, and the other bracket is inserted between the guide rails to position the supporting bracket in the width direction; and a raised portion is formed to the mounting bracket, the supporting bracket having its upper end butted against the raised portion so that the supporting bracket is positioned in the height direction.

According to the arrangement of the fifth aspect, upon fixing the supporting bracket to the mounting bracket, the supporting bracket is guided along the inner side of the guiding rails so as to be positioned in the width direction on the mounting bracket, and by the upper end of the supporting bracket butting against the raised portion on the mounting bracket, the position of the supporting bracket is determined in the height direction.

The sixth aspect of the present invention relates to the display device according to anyone of aspects 1 through 5, wherein the supporting bracket is pivotably attached to the stand so as to enable the mounting angle of the display unit to be adjusted in front and rear directions with respect to the stand.

According to the arrangement of the sixth aspect, the angle of the liquid crystal panel can be adjusted by tilting the display portion fixed to the supporting bracket in front and rear directions.

The seventh aspect of the present invention relates to the display device according to the first aspect, further comprising a stepped recess portion formed between the back cabinet and the mounting bracket and positioned close to the mounting bracket with a space formed therebetween for inserting the supporting bracket, wherein said opening is provided to the stepped recess portion, and a decorative cover for covering the stepped recess portion.

According to the arrangement of the seventh aspect, the supporting bracket is inserted to the space between the stepped recess portion and the mounting bracket, and then a fixing member such as a fixing screw is inserted through the opening formed to the stepped recess portion to fix the supporting bracket to the mounting bracket. In this case, since the stepped recess portion is positioned near the supporting bracket, the hole through which the fixing member is inserted or the screw hole to which the fixing member is to be engaged can be visually confirmed through the opening. Further, by hiding the stepped recess portion with the decorative cover, the opening and the fixing means visible through the opening can be hidden from the exterior.

DETAILED DESCRIPTION OF THE PREFERRED EMBODIMENTS

Figure 4:
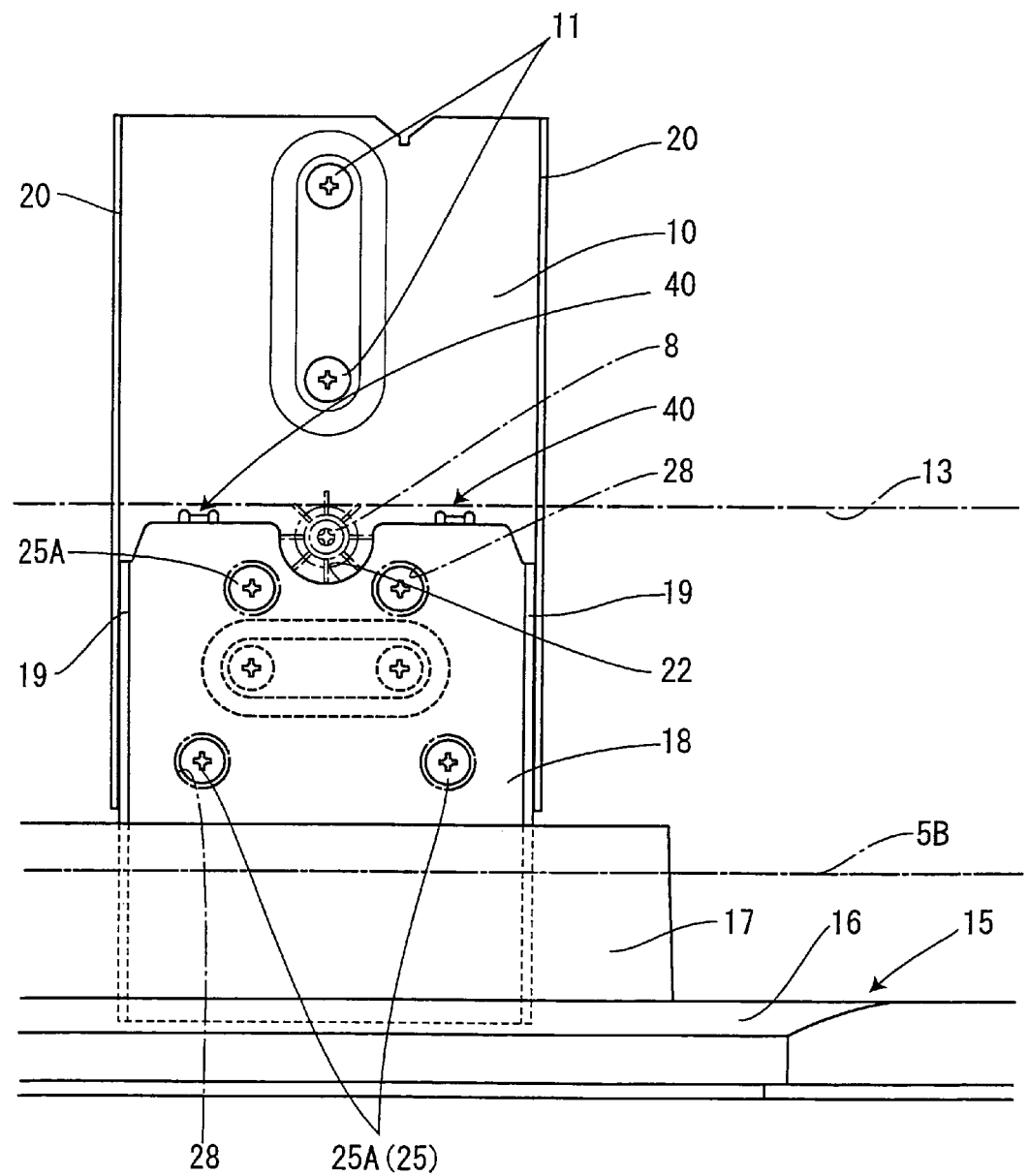
FIG. 4 is a rear view showing the supporting bracket and the mounting bracket in fixed state.
Figure 5:
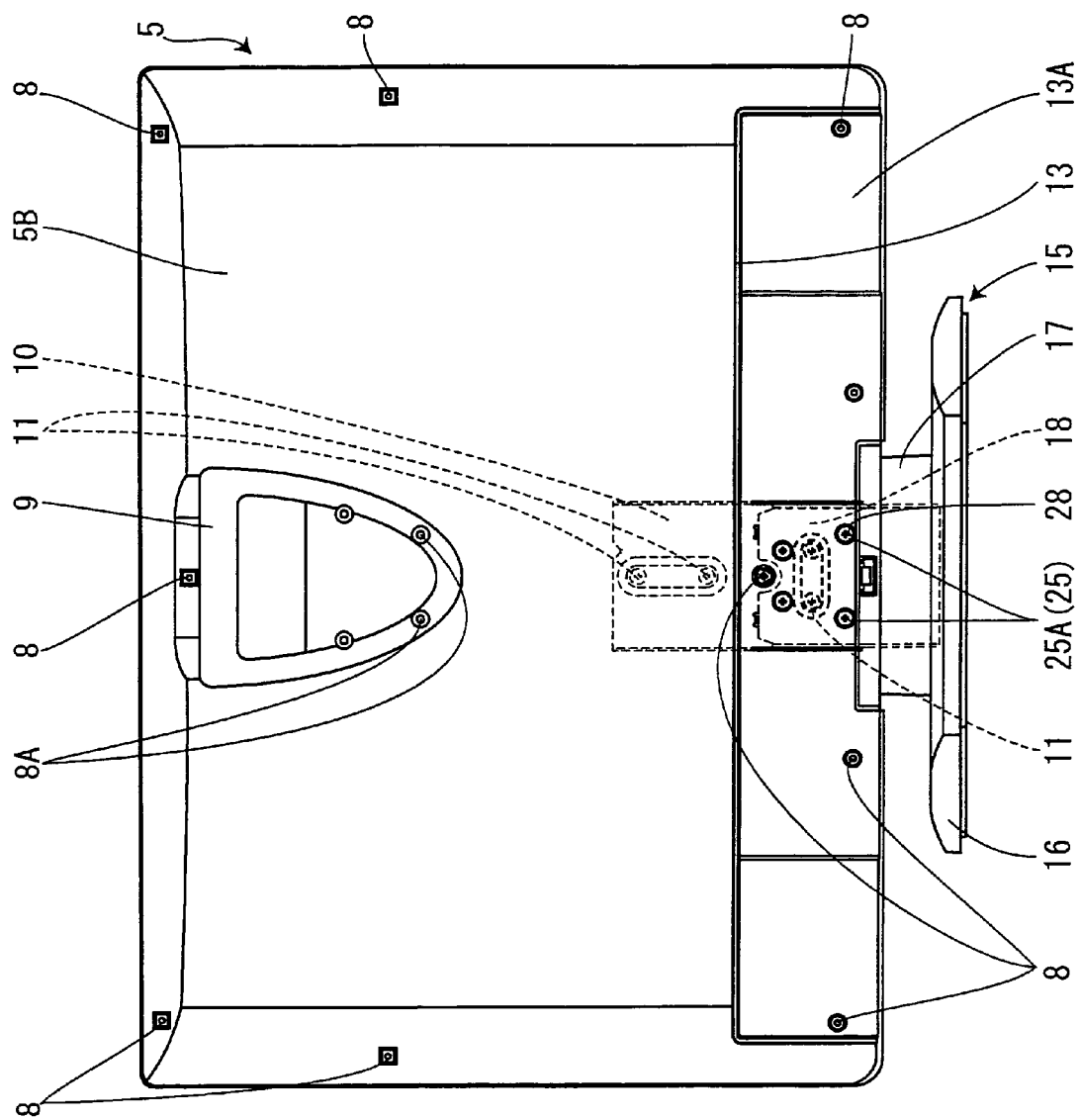
FIG. 5 is a rear view with the decorative cover removed according to the above embodiment.
Figure 6:
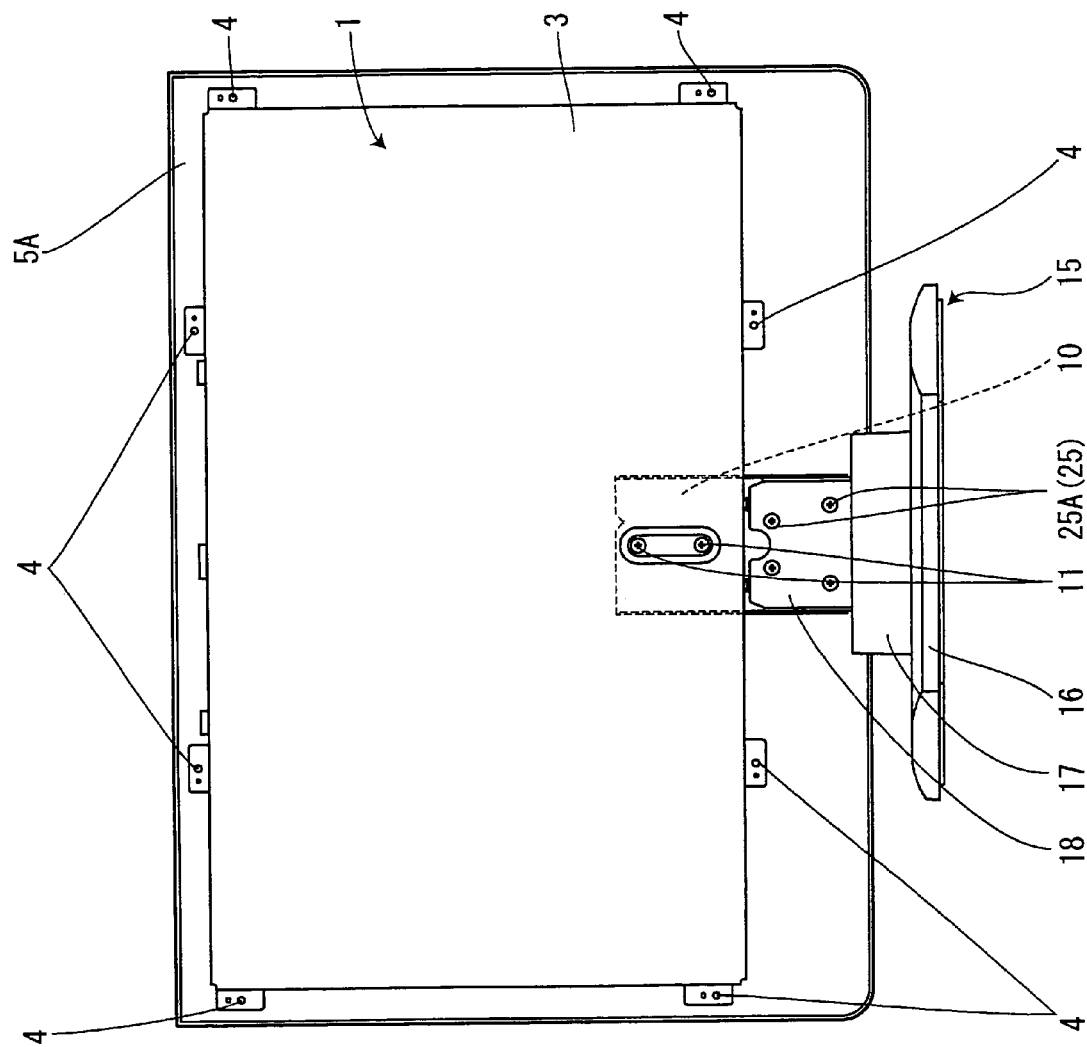
FIG. 6 is a rear view with the back cabinet removed according to the above embodiment.

Now, the preferred embodiments for carrying out the present invention will be described with reference to the drawings. FIGS. 1 through 6 illustrate a preferred embodiment of the present invention, wherein reference number 1 denotes a display unit composed of a liquid crystal panel 2 and a metallic mounting cover 3 for fixing the liquid crystal panel 2 to a cabinet described in detail later. The liquid crystal panel 2 has a liquid crystal display device body and a metallic panel fixing frame 2A covering the outer circumference of the liquid crystal display device body from its rear face, wherein the panel fixing frame 2A is fixed to the mounting cover 3 via multiple screws (not shown). A cabinet 5 to which the liquid crystal panel 2 is assembled is separated into a front cabinet 5A and a back cabinet 5B, wherein the front cabinet 5A has a display window 6 for the liquid crystal panel 2, and the front cabinet 5A and the back cabinet 5B are fixed via screws 8 as illustrated in FIG. 5, with a handle 9 fixed to the upper center area of the back cabinet 5B via screws 8A. As described, a display portion 1A is formed by fixing the display unit 1 to the cabinet 5.

Reference number 10 denotes a mounting bracket formed of a metal panel member and having a plate-shaped body. The mounting bracket 10 is fixed to the lower center area of the mounting cover 3 via screws 11 so that a lower portion of the bracket 10 extends beyond the mounting cover 3, and the lower end of the mounting bracket 10 extending downward beyond the mounting cover 3 is fixed via screws 11A to a mounting boss 12 formed integrally to the front cabinet 5A. Further, a stepped recess portion 13 is formed to the lower portion of the back cabinet 5B, the bottom portion 13A of which is fixed via the mounting bracket 10 to a boss portion 21 projected from the front cabinet 5A by screw 8A. Another recessed portion 14 projected further inwardly from the stepped recess portion 13 is formed to which the screw 8 is inserted, the recessed portion 14 defining a space S between the mounting bracket 10 and the stepped recess portion 13 through which a supporting bracket 18 described in detail later can be inserted.

Figure 1:
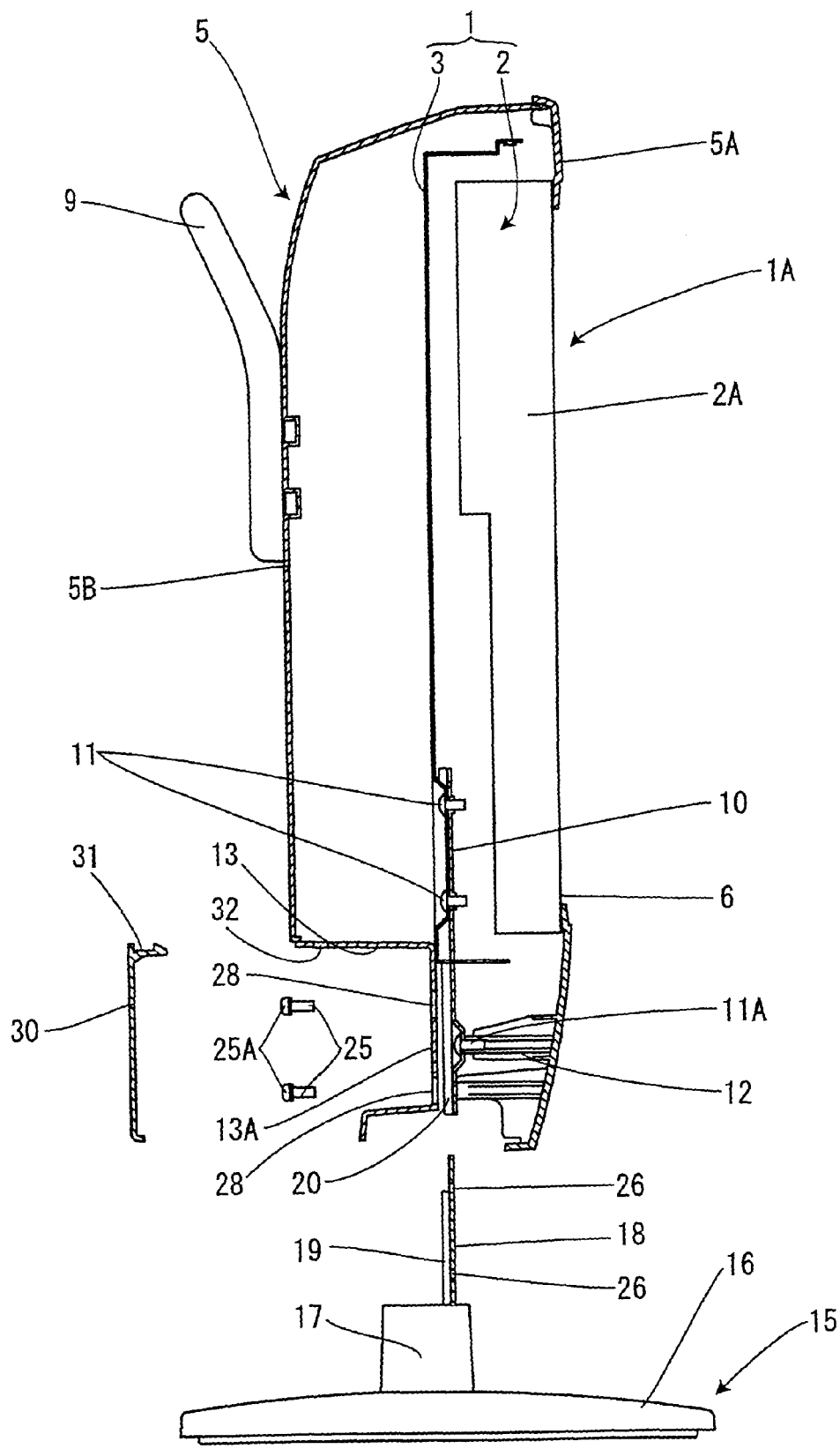
FIG. 1 is a cross-sectional view showing the whole structure of a preferred embodiment of the present invention.
Figure 2:
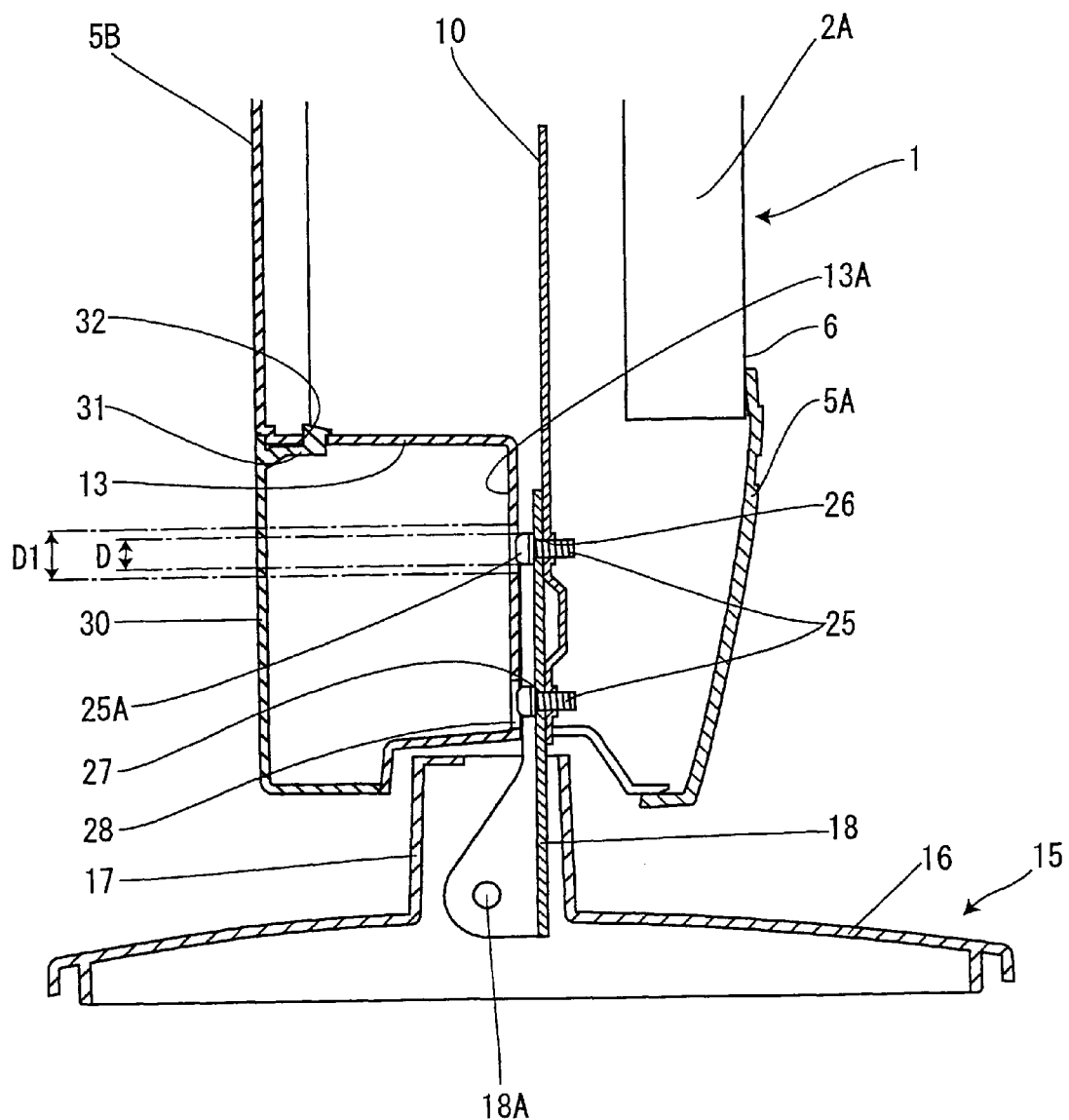
FIG. 2 is an enlarged cross-sectional view showing a supporting bracket in fixed state according to the above embodiment.
Figure 3:
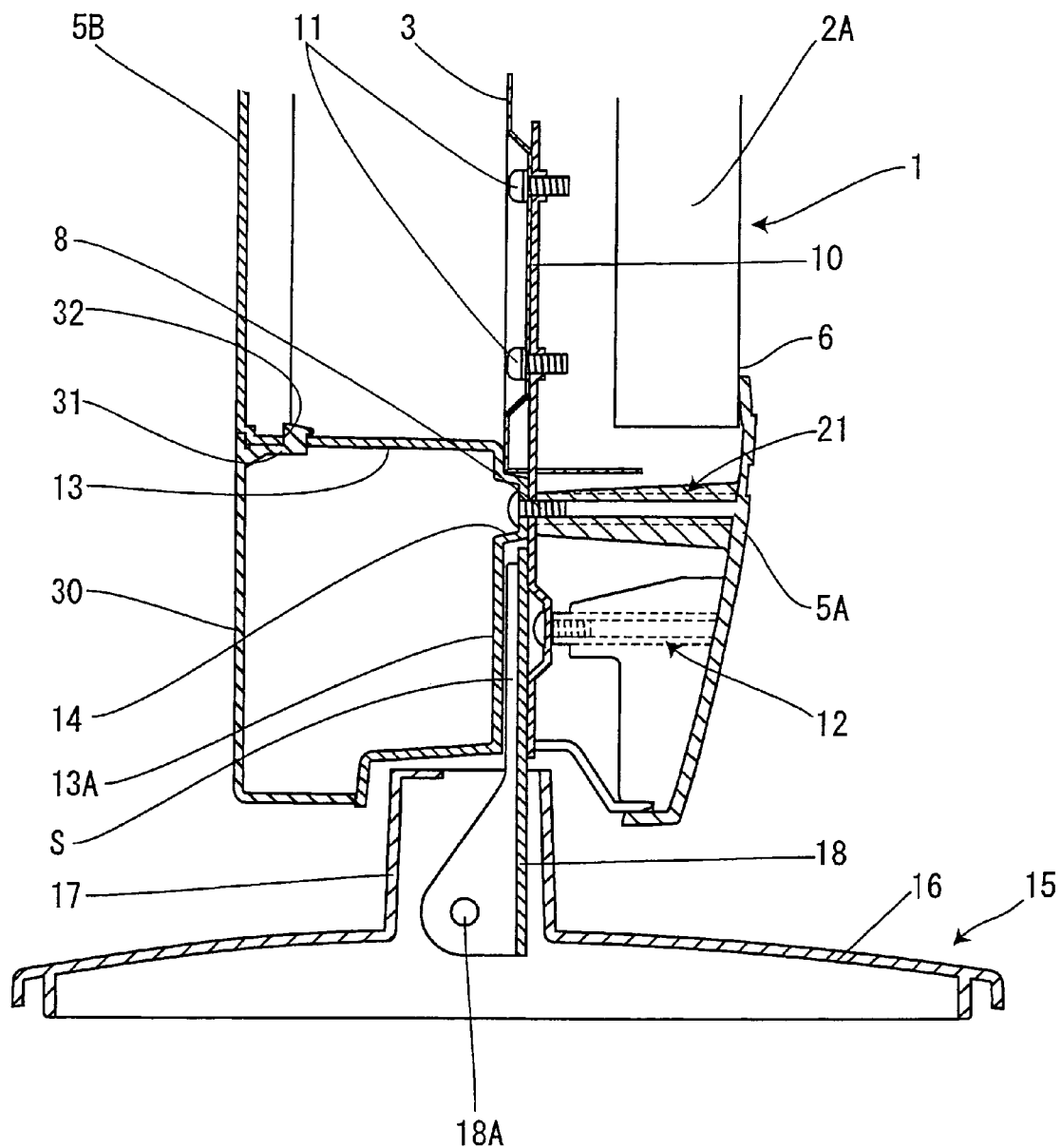
FIG. 3 is an enlarged cross-sectional view showing a mounting bracket in fixed state according to the above embodiment.

Reference number 15 denotes a stand for supporting the display portion 1A, composed of a support base 16 and a hollow leg portion 17 standing upright from the support base 16, wherein the leg portion 17 has in its inner area a supporting bracket 18 for fixing the mounting bracket 10, the supporting bracket 18 is pivotably mounted via a pivot shaft 18A enabling the bracket to be tilted in front and rear directions. The supporting bracket 18 is made of a metallic material similar to the mounting bracket 10, which is plate-shaped and having a pair of flange portions 19 formed by bending the sides thereof. Further, the mounting bracket 10 has a pair of guide rails 20 formed by bending the sides thereof into flanges, which is used as positioning means for positioning the supporting bracket 18 in the width direction by pinching the flange portions 19 on the supporting bracket 18 from both sides. Furthermore, the mounting bracket 10 has a raised portion 40, as illustrated in FIG. 4, which constitutes a positioning means for positioning the supporting bracket in the height direction by having the upper end of the supporting bracket 18 butts against the raised portion 40. The supporting bracket 18 has a semicircular notch 22 for preventing interference with the recessed portion 14. With the supporting bracket 18 correctly positioned via the guide rails 20 and the raised portion 40 as positioning means on the mounting bracket 10, the supporting bracket 18 and the mounting bracket 10 are fixed together via four fixing screws 25 as fixing means. The fixing screws 25 are engaged to screw holes 26 formed to the mounting bracket 10, and through holes 27 for allowing the screws 25 to be passed therethrough are formed to portions of the supporting bracket 18 corresponding to the screw holes 26. Further, openings 28 allowing head portions 25A of the fixing screws 25 to be passed therethrough are formed to the stepped recess portion 13 of the back cabinet 5B. In other words, as shown in FIG. 2, the inner diameter D1 of the opening 28 is formed greater than the outer diameter D of the head portion 25A of the fixing screw 25, so as to allow the mounting bracket 10 and the supporting bracket 18 positioned inwardly from the cabinet 5 to be fixed via fixing screws 25 from outside the back cabinet 5B. A decorative cover 30 is attached to the stepped recess portion 13, and a stopper claw 31 formed to the decorative cover 30 is engaged to a stopper hole 32 formed to the stepped recess portion 13. Thus, the openings 28 are covered by attaching the decorative cover 30 to the stepped recess portion 13.

The method for assembling the display device according to the present embodiment having the arrangement described above will now be explained. First, the panel fixing frame 2A of the liquid crystal panel 2 and the mounting cover 3 are fixed via screws (not shown), and a mounting bracket 10 is fixed via screws 11 to the lower center area of the mounting cover 3. Then, the mounting cover 3 having the liquid crystal panel 2 and the mounting bracket 10 fixed thereto is fixed to the front cabinet 5A via multiple screws 4. Next, the front cabinet 5A is fixed to the back cabinet 5B via screws 8, by which the display unit 1 is secured to the cabinet 5. The handle 9 is fixed via screws 8A to the back cabinet 5B, but the fixing of the handle 9 can be carried out before or after fixing the front cabinet 5A to the back cabinet 5B. After fixing the front cabinet 5A to the back cabinet 5B, the supporting bracket 18 fixed to the stand 15 is inserted through the space S between the back cabinet 5B and the mounting bracket 10. At this time, the supporting bracket 18 has its flange portions 19 formed by bending both sides thereof guided along the inner side of the guide rails 20 formed to the sides of the mounting bracket 10. Thereby, the supporting bracket 18 is guided by the mounting bracket 10 while being positioned horizontally along with the inserting movement of the supporting bracket 18, the upper end of the supporting bracket 18 is butted against and stopped by the raised portion 40 formed on the mounting bracket 10, by which the supporting bracket 18 is positioned in the height direction. At this position, the openings 28 formed to the back cabinet 5B, the through holes 27 formed to the supporting bracket 18 and the screw holes 26 formed to the mounting bracket 10 correspond. Then, fixing screws 25 are inserted to the through holes 27 of the supporting bracket 18 through the openings 28 on the back cabinet 5B, and screw-engaged to the screw holes 26 on the mounting bracket 10 to thereby fix the mounting bracket 10 and the supporting bracket 18. After fixing in this manner the stand 15 to the cabinet 5 having the display unit 1 built therein, the stopper claw 31 formed to the decorative cover 30 is engaged to the stopper hole 32 formed to the stepped recess portion 13 of the back cabinet 5B to cover the stepped recess portion 13 with the decorative cover 30, and the assembly work is completed. If the display portion 1A assembled in this manner is used on the floor etc., it will be supported by the stand 15, but if it is to be hung on a wall, the screws 8A are disengaged to remove the handle 9 from the back cabinet 5B, and the decorative cover 30 is removed from the stepped recess portion 13 of the back cabinet 5B. Then, a tool not shown is inserted through the openings 28 of the back cabinet 5B to disengage and remove the fixing screws 25 from the openings 28 so as to take off the stand 15 from the cabinet 5 including the display unit 1 without removing the back cabinet 5B. The cabinet 5 having the handle 9 and the stand 15 removed therefrom can be hung on a wall by having a hook or the like attached to the wall surface engage to a hanging hole (not shown) formed on the back cabinet 5B.

As described, according to the present embodiment, the stand 15 can be attached and detached easily without removing the back cabinet 5B covering the mounting bracket 10. That is, by providing openings 28 having larger diameters than the heads 25A of fixing screws 25 fixing the stand 15 and the mounting bracket 10 to the back cabinet 5B, the screws 25 for fixing the supporting bracket 18 and the mounting bracket 10 can be inserted through the openings 28 or the disengaged fixing screws 25 can be removed through the openings 28 when attaching or detaching the stand 15. The mounting bracket 10 is covered by the back cabinet 5B and is not exposed directly to the exterior, so it does not deteriorate the appearance of the device. When adjusting the image and color of the liquid crystal panel 2 during assembly, the adjustment process can be performed efficiently since the display unit 1 can be self-supported easily by inserting the supporting bracket 18 fixed to the stand 15 to the display portion 1A having the display unit 1 assembled thereto. By simply inserting the supporting bracket 18 to the space S between the mounting bracket 10 and the back cabinet 5B, the bracket 18 is positioned in the width direction and guided by the guide rails formed on both sides of the mounting bracket 10, and is positioned in the height direction by having its upper end butt against the raised portion 40 formed to the mounting bracket 10. Thus, the display portion 1A can be easily attached temporarily to the stand 15. Furthermore, since the guide rails 20 and the raised portion 40 positioning the supporting bracket 18 enable the openings 28 formed to the back cabinet 5B, the through holes 27 formed to the supporting bracket 18 and the screw holes 26 formed to the mounting bracket 10 to be easily positioned correspondingly, the assembly work of the stand 15 is further facilitated. Since the back cabinet 5B has the stepped recess portion 13 disposed close to the mounting bracket 10 with a space S formed between the bracket 10 through which the supporting bracket 18 is inserted, upon inserting fixing screws 25 from the openings 28 to the through holes 27 of the supporting bracket 18 and the screw holes 26 of the mounting bracket 10, the position of the through holes 27 and the screw holes 26 can be visually confirmed directly from the exterior of the back cabinet 5B, facilitating the engagement operation of the fixing screws 25. Since the stepped recess portion 13 is covered by the decorative cover 30 in the end, the decorative cover 30 hides the openings 28 and the fixing screws 25 otherwise visible through the openings 28, thereby improving the design of the display device. Since the supporting bracket 18 for fixing the cabinet 5 is pivotably attached via the pivot shaft 18A and capable of being tilted in the front and rear directions with respect to the stand 15, the angle of the display portion 1A fixed to the supporting bracket can be adjusted. Thus, the user can adjust the angle of the display portion 1A easily.

One preferred embodiment of the present invention has been described in detail, but the present invention is not restricted to the present embodiment, and various modifications are possible within the scope of the invention. For example, guide rails 20 for positioning the supporting bracket 18 are formed to the mounting bracket 10 according to the present invention, but the guide rails 20 can be formed to the supporting bracket 18 to guide the mounting bracket 10, or positioning means other than guide rails can be adopted. Further, the means for fixing the supporting bracket 19 to the mounting bracket 10 are not restricted to fixing screws, but other means such as bolts and/or nuts can be adopted as long as the fixing members fixing the supporting bracket 18 to the mounting bracket 10 can be passed through the openings 28 formed to the back cabinet 5B.

The effects of the present invention are as follows.

According to the first aspect of the present invention, the display device comprises a display unit having a liquid crystal panel on a front face thereof; a display portion having a front cabinet with a display window for the liquid crystal panel and a back cabinet, and having the display unit built therein; and a stand for supporting the display portion; wherein the display device further comprises a mounting bracket extending downward from the display unit; a supporting bracket provided on the stand and fixed to the mounting bracket; and a fixing member for fixing the supporting bracket to the mounting bracket; wherein the back cabinet covers at least the mounting bracket, and is provided with an opening for the fixing member to pass through. Since the mounting bracket is not exposed to the exterior, the display device has a good, attractive design, and since the stand and the display portion including the display unit can be fixed together easily without removing the back cabinet, and the stand and the display unit can be separated without removing the back cabinet, the assembly work of the display device can be performed efficiently.

According to the second aspect of the present invention, the display device according to the first aspect characterizes in that the mounting bracket is fixed to the front cabinet side. Thus, by fixing the mounting bracket secured to the front cabinet to the supporting bracket provided on the stand, the display portion including the display unit and the stand can be fixed together easily.

According to the third aspect of the present invention, the display device according to the first aspect characterizes in that the fixing member is composed of a fixing screw, and an inner diameter of the opening is formed greater than a diameter of the fixing screw. Thus, the fixing screw for fixing the supporting bracket to the mounting bracket can be tightened from outside the back cabinet without removing the back cabinet, and the disengaged fixing screw can be removed through the opening when separating the display portion from the stand.

According to the fourth aspect of the present invention, the display device according to any one of aspects 1 through 3 characterizes in further comprising a positioning means for positioning the supporting bracket in a height direction and a width direction with respect to the mounting bracket. Therefore, when adjusting the image and color of the liquid crystal panel, the supporting bracket should simply be inserted to the display portion including the display unit to have the supporting bracket positioned and fixed on the mounting bracket, and the display portion can thereby stand by itself to facilitate adjustment work.

According to the fifth aspect of the present invention, the display device according to the fourth aspect characterizes in that a pair of guide rails is formed to at least one of the mounting bracket or the supporting bracket, and the other bracket is inserted between the guide rails to position the supporting bracket in the width direction; and a raised portion is formed to the mounting bracket, the supporting bracket having its upper end butted against the raised portion so that the supporting bracket is positioned in the height direction. Thus, the supporting bracket can be guided by the guiding rails on the mounting bracket and determined of its position in the width direction, and the upper end of the supporting bracket can be butted against the raised portion of the mounting bracket and determined of its position in the height direction, so the display portion can easily be temporarily engaged to the stand.

According to the sixth aspect of the present invention, the display device according to any one of aspects 1 through 5 characterizes in that the supporting bracket is pivotably attached to the stand so as to enable the mounting angle of the display unit to be adjusted in front and rear directions with respect to the stand. Thus, a user can easily adjust the angle of the display portion.

According to the seventh aspect of the present invention, the display device according to the first aspect further comprises a stepped recess portion formed between the back cabinet and the mounting bracket and positioned close to the mounting bracket with a space formed therebetween for inserting the supporting bracket, wherein said opening is formed on the stepped recess portion, and a decorative cover for covering the stepped recess portion. Thus, the through hole of the supporting bracket for inserting the fixing screw and the screw hole formed to the mounting bracket can be easily confirmed visually through the opening from outside the back cabinet, which facilitates the tightening operation of the fixing member. Moreover, since the stepped recess portion is covered by the decorative cover in the end, the opening and the fixing means visible through the opening can be hid by the decorative cover, and the exterior design of the display device is thereby improved.

What is claimed is:

1. A display device comprising:
    a display unit having a liquid crystal panel on a front face thereof;
    a display portion having a front cabinet with a display window for the liquid crystal panel and a back cabinet, and having the display unit built therein; and
    a stand for supporting the display portion; wherein the display device further comprises a mounting bracket extending downward from the display unit;
    a supporting bracket provided on the stand and fixed to the mounting bracket; and
    a fixing member comprising a head portion and a threaded portion, the head portion having a greater diameter than the threaded portion, the fixing member fixing the supporting bracket to the mounting bracket; wherein
    the back cabinet covers at least the mounting bracket, and is provided with an opening for the fixing member to pass through, wherein a space formed therebetween for inserting the support bracket between the back cabinet and the mounting bracket;
    a portion of the fixing member is arranged between an inside surface of the back cabinet and an inside surface of the front cabinet, and
    an inside diameter of the opening provided on the mounting bracket is formed greater than the outside diameter of the head portion.

2. The display device according to claim 1, wherein the mounting bracket is fixed to the front cabinet side.

3. The display device according to claim 1, wherein the fixing member is a fixing screw.

4. The display device according to any one of claims 1 through 3, further comprising a positioning means for positioning the supporting bracket in a height direction and a width direction with respect to the mounting bracket.

5. The display device according to any one of claims 1 through 3, further comprising a positioning means for positioning the supporting bracket in a height direction and a width direction with respect to the mounting bracket, wherein:

a pair of guide rails is formed to at least one of the mounting bracket or the supporting bracket, and the other bracket is inserted between the guide rails to position the supporting bracket in the width direction; and a raised portion is formed to the mounting bracket, the supporting bracket having its upper end butted against the raised portion so that the supporting bracket is positioned in the height direction.

6. The display device according to any one of claims 1 through 3, wherein the supporting bracket is pivotably attached to the stand so as to enable the mounting angle of the display unit to be adjusted in front and rear directions with respect to the stand.

7. The display device according to any one of claims 1 through 3, further comprising a positioning means for positioning the supporting bracket in a height direction and a width direction with respect to the mounting bracket, wherein the supporting bracket is pivotably attached to the stand so as to enable the mounting angle of the display unit to be adjusted in front and rear directions with respect to the stand.

8. The display device according to any one of claims 1 through 3, further comprising a positioning means for positioning the supporting bracket in a height direction and a width direction with respect to the mounting bracket, wherein a pair of guide rails is formed to at least one of the mounting bracket or the supporting bracket, and the other bracket is inserted between the guide rails to position the supporting bracket in the width direction;

a raised portion is formed to the mounting bracket, the supporting bracket having its upper end butted against the raised portion so that the supporting bracket is positioned in the height direction; and the supporting bracket is pivotably attached to the stand so as to enable the mounting angle of the display unit to be adjusted in front and rear directions with respect to the stand.

9. The display device according to claim 1, further comprising:

a stepped recess portion formed between the back cabinet and the mounting bracket and positioned close to the mounting bracket, wherein said opening is provided to the stepped recess portion, and a decorative cover for covering the stepped recess portion.

* * * * *